United States Patent Office 3,763,204
Patented Oct. 2, 1973

3,763,204
POLYMERIZABLE DISILANOLS HAVING IN-CHAIN PERFLUOROALKYL GROUPS
William J. Patterson, Madison, and Donald E. Morris, Huntsville, Ala., assignors to the United States of America as represented by the Administrator of the National Aeronautics and Space Administration
No Drawing. Original application Dec. 22, 1970, Ser. No. 100,774, now Patent No. 3,666,718. Divided and this application Jan. 20, 1972, Ser. No. 219,590
Int. Cl. C07f 7/08
U.S. Cl. 260—448.2 D  4 Claims

ABSTRACT OF THE DISCLOSURE

Disilanols having the formula

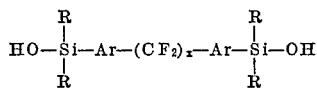

where R is a monovalent hydrocarbon radical, Ar is an arylene group and $x$ is from 2 to 8 and a process for preparing the same are discussed. The disilanols, when reacted with a diaminosilane and cured, produce polymeric material resistant to hydrocarbon fuels and stable at elevated temperatures.

ORIGIN OF THE INVENTION

The invention described herein was made by employees of the United States Government and may be manufactured and used by or for the Government for governmental purposes without the payment of any royalties thereon or therefor.

CROSS REFERENCE TO RELATED APPLICATIONS

The invention described herein is a division of application Ser. No. 100,774, filed Dec. 22, 1970, now U.S. Pat. No. 3,666,718.

BACKGROUND OF THE INVENTION

This invention relates to fluorine-containing organosilicon compounds and more particularly to disilanols having in-chain perfluoroalkyl groups.

The successful development of hypersonic aircraft and certain types of reusable space shuttle vehicles will require the availability of improved high-temperature sealant materials. Fuel-tank sealants for such applications must be resistant to hydrocarbon fuels and stable under thermo-oxidative environments at elevated temperatures such as 450° F. to 500° F. for extended periods. In addition, candidate sealant materials must not contribute to stress corrosion of the titanium alloys used for fuel tank construction.

Previously available sealant materials generally fail to meet one or more of the above criteria. Sealants which are resistant to hydrocarbon fuels have relatively low thermal stability and materials which show better thermal stability lack the required fuel resistance. Fuel resistance consistent with some improvement in thermal stability has been obtained in newly developed polymer systems which incorporate fluorine atoms along the polymer backbone or in pendant groups. However, most of the previous fluorine-containing sealant polymers have been deficient in their tendency to promote stress corrosion of titanium alloys, probably because of elimination of hydrogen and fluorine from adjacent carbon atoms in the form of HF, and in their marginal thermal stability. Polymerizable fluorine-containing compounds, tailored to provide fuel resistance and thermal stability without having a structure likely to release HF, are accordingly needed.

SUMMARY OF THE INVENTION

The present invention is directed to disilanols having the formula

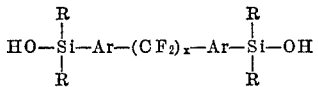

where R is a monovalent hydrocarbon radical, Ar is an arylene group and $x$ is from 2 to 8 and to a process for preparing the same by hydrolysis of the corresponding dihydride compound, which in turn is prepared by reaction of a dibromoaryl perfluoroalkane with a monochloro silane. Disilanols of the formula given above are useful for preparation of polymers by reaction with diaminosilanes. Upon curing with ethyl silicate the polymers are converted to elastomeric material showing superior resistance to hydrocarbon fuels, favorable thermal stability and a minimum tendency to promote corrosion of titanium alloys. This combination of properties is believed to result from incorporation of perfluoroalkyl groups between arylene groups in the polymer backbone by means of the novel disilanols.

It is therefore an object of this invention to provide polymerizable disilanols containing in-chain perfluoroalkyl groups and aromatic groups.

Another object is to provide a process for preparing such disilanols.

Still another object is to provide polymeric sealant material that is resistant to hydrocarbon fuels and is stable at elevated temperatures.

Other objects and advantages of the invention will be apparent from the following detailed description and the appended claims.

DESCRIPTION OF THE PREFERRED EMBODIMENT

Disilanols embodying the present invention are represented by the formula

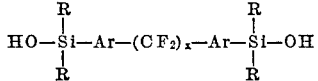

where R is a monovalent hydrocarbon radical, Ar is an arylene group and $x$ is a whole number from 2 to 8. The monovalent hydrocarbon radical designated by R can be an alkyl radical such as methyl, ethyl, propyl, butyl and the like; an aryl radical such as phenyl, xylyl, tolyl, etc.; an aralkyl radical such as phenylethyl or benzyl; a cycloaliphatic radical such as cyclohexyl; or any other monovalent aliphatic or aliphatic radical. The simpler disilanols having methyl or phenyl groups at these sites are prepared for use in polymer preparations. The arylene group designated by Ar can be any divalent aromatic group exemplified by p-phenylene, m-phenylene, biphenylene, naphthalene, phenylene ether, diphenylmethylene and diphenylpropylene.

Disilanols having the formula given above can be prepared by hydrolysis of the corresponding dihydride compound, which in turn is prepared by reaction of a dibromoaryl perfluoroalkane with a monochloro silane. In a preferred process sequence a perfluoroalkyl diiodide is first prepared by reacting the appropriate perfluoro diacid chloride with potassium iodide. Such reaction can be carried out by heating a mixture of these reactants in a stirred pressure vessel at a temperature of 200° C. and a pressure of 500 to 600 p.s.i. for 6 hours, using a modification of the procedure given by Krespan, J. Org. Chem. 23, 2016 (1958). The perfluoroalkyl diiodide is then reacted with an iodobromo arylhalide to form the dibromoaryl perfluoroalkane. This reaction is carried out by slurrying two moles of the iodobromo arylhalide with one mole of the diiodo compound in an aprotic solvent such as N,N-dimethylformamide in the presence of an activated copper-bronze catalyst.

The dibromoaryl perfluoroalkane is then reacted with a monochloro silane having the formula

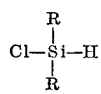

where R is a monovalent hydrocarbon radical as defined above to produce the precursor hydride compound. The silane-dibromide reaction can be carried out by slowly adding one mole of the dibromide in a solvent such as tetrahydrofuran to a mixture of magnesium turnings and two moles of the silane in the same solvent under conditions of stirring and slight heating. The resulting dihydride is converted by hydrolysis to a disilanol of the formula given above. Hydrolysis can be carried out by a modification of the procedure given by Merker et al., J. Polymer Sci., A, 2, 15 (1964) for preparation of non-fluorinated silanols. Such procedure involves hydrolysis with a caustic solution in an alcohol solvent system. Best results are obtained by first contacting the dihydride with a solution of sodium ethoxide in ethanol and then adding a solution of sodium hydroxide in methanol, along with an aqueous sodium hydroxide solution. Other hydrolysis methods can also be used.

Disilanols prepared as described above are useful for preparation of curable polymers having repeating units of the formula

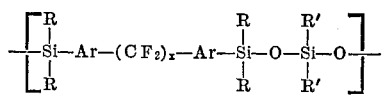

where R, Ar and $x$ have the meaning given above and R' is a monovalent hydrocarbon radical defined for R or a fluorine-substituted monovalent hydrocarbon radical. Such polymers are prepared by reacting the disilanol with a diaminosilane having the formula

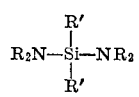

where R is a monovalent hydrocarbon radical, and preferably a methyl radical, and R' is a monovalent hydrocarbon radical, defined herein to include fluorine-substituted radicals such as

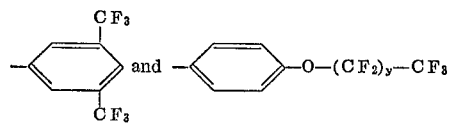

where $y=0$, 1 or 2. By using a diamino silane having fluorine-substituted pendant radicals at these sites, additional fuel resistance can be imparted into the polymer.

Polymerization proceeds readily upon heating an equimolar mixture of these reactants in a dry solvent such as toluene to a temperature of 90 to 100° C. The resulting polymer is a viscous oil having a degree of polymerization up to about 100, which polymer can be cured to form a tough, flexible thermoset elastomer. Curing can be carried out at room temperature by addition of an ethyl silicate cross-linking agent and a metal salt catalyst such as dibutyltin diacetate at proportions of 10 and 2 weight percent, respectively. Other curing agents and catalysts can also be used.

The invention is further illustrated by the following specific example.

Example I

The following procedure exemplifies the preparation of a disilanol wherein R in the formula given above is methyl, Ar is 1,4-phenylene and $x$ is 3. Perflouoro-glutaryl chloride (200.0 grams, 0.722 mole) was treated with potassium iodide (320.0 grams, 1.93 moles) in a stirred pressure vessel for six hours at 200° C. and 500–600 p.s.i. The product 1,3-diido-1,1,2,2,3,3-hexafluoropropane, b. 105° C./350 mm., was obtained in 45 percent yield. The diido compound (140.0 grams, 0.347 mole) was then reacted with p-iodobromobenzene (216.0 grams, 0.763 mole) in the presence of 198 grams of an activated copper-bronze catalyst by slurrying in N,N-dimethylformamide. The product 1,3-bis-(p-bromophenyl)-1,1,2,2,3,3-hexafluoropropane was purified as a crystalline solid, m. 124–5° C. in 60 percent yield.

Analysis.—Calcd. for $C_{15}H_8Br_2F_6$ (percent): C, 38.99; H, 1.75; Br, 34.59. Found (percent): C, 38.2; H, 2.2; Br, 33.8.

The resulting dibromide (130 grams, 0.282 mole) was slowly added as a solution in tetrahydrofuran to a mixture of magnesium turnings (15.0 grams, 0.564 mole) and dimethyl chlorosilane (53.3 grams, 0.564 mole) in 100 ml. of tetrahydrofuran, which was stirred and heated slightly. The product, 1,3-bis[p-(dimethylsilyl)phenyl]-1,1,2,2,3,3-hexafluoropropane was isolated by extraction with cyclohexane and recovered in 50% yield by distillation, b. 170° C./2.5 mm.

Analysis.—Calcd. for $C_{19}H_{22}F_6Si_2$ (percent): C, 54.36; H, 5.28; Si 13.34. Found (percent): C, 53.7; H, 5.05; Si, 14.1.

The resulting dihydride was hydrolyzed by treatment with an ethanol-sodium ethoxide solution, and a water-sodium hydroxide-methanol solution. The crude diol was precipitated in potassium hydrogen phosphate and recrystallized from carbon tetrachloride in 30% yield, m. 118° C., as 1,3-[p-(hydroxymethylsilyl)phenyl]-1,1,2,2-3,3-hexafluoropropane.

Analysis.—Calcd. for $C_{19}H_{22}F_6O_2Si_2$ (percent): C, 50.42 H, 4.91; Si, 12.40. Found (percent): C, 48.8; H, 4.54; Si, 11.8.

The disilanol was then reacted with an equimolar amount of bis(dimethylamino)dimethylsilane by heating to a temperature of 90–100° C. in dry toluene to form a viscous polymer having an inherent viscosity of 0.5 at a concentration of 1 gm./dl. in tetrahydrofuran at 30° C. A sample of the polymer was cured by addition of ethyl silicate and dibutyltin diacetate at proportions of 10 and 2 weight percent respectively to produce tough, flexible thermoset elastomeric material. The elastomeric material showed no degradation, color change or loss of mechanical properties upon being boiled in water for 24 hours. Soaking the sample for 24 hours in JP–4 aviation fuel resulted in swelling of 30% of its original volume, as compared to 150% for conventional silicones.

It is to be understood that the above example is merely illustrative and that modifications and changes in the procedures and reaction conditions described therein can be employed without departing from the spirit and scope of the invention.

What is claimed is:
1. A compound having the formula

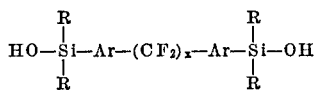

where R is a monovalent hydrocarbon radical selected from the group consisting of methyl, ethyl and phenyl, Ar is a phenylene group and $x$ is a whole number from 2 to 8.

2. The compound of claim 1 wherein R is a methyl radical.

3. The compound of claim 2 wherein Ar is p-phenylene.

4. The compound of claim 3 wherein $x$ is 3.

References Cited
UNITED STATES PATENTS

| 2,561,429 | 7/1951 | Sveda | 260—448.2 D |
| 3,647,740 | 3/1972 | Loree et al. | 260—448.2 D X |
| 3,666,718 | 5/1972 | Patterson et al. | 260—448.2 D X |

OTHER REFERENCES

Merger et al., J. Polymer Sci., A, 2, p. 15, 1964.

DANIEL E. WYMAN, Primary Examiner
P. F. SHAVER, Assistant Examiner

U.S. Cl. X.R.

260—46.5 E, 448.2 E